United States Patent [19]

Yanata et al.

[11] Patent Number: 4,654,673
[45] Date of Patent: Mar. 31, 1987

[54] THERMAL PRINTER WITH GRADUATED CAM ACTUATION

[75] Inventors: Saki Yanata; Takahito Maruyama; Chikashi Osakama, all of Iwate, Japan

[73] Assignee: Alps Electric Co., Ltd., Japan

[21] Appl. No.: 786,947

[22] Filed: Oct. 11, 1985

[30] Foreign Application Priority Data

Oct. 11, 1984 [JP] Japan ................................ 59-152230

[51] Int. Cl.[4] ...................... G01D 15/10; G01D 15/16; B41J 3/02

[52] U.S. Cl. .......................... 346/76 PH; 346/139 C; 400/120

[58] Field of Search .............. 346/76 PH, 134, 139 A, 346/139 R, 139 C; 400/120; 219/216 PH

[56] References Cited

U.S. PATENT DOCUMENTS 3,761,950 9/1973 Yeiser ................................. 346/134
3,855,448 12/1974 Hanagata ....................... 346/76 PH

*Primary Examiner*—E. A. Goldberg
*Assistant Examiner*—Mark Reinhart
*Attorney, Agent, or Firm*—Guy W. Shoup

[57] ABSTRACT

A thermal printer including a cam for pivoting a carriage guide plate to cause a thermal head mounted on the carriage to approach/separate from a platen. The cam is of a mountain-shaped form whose one side for pivoting the carriage guide plate to release the thermal head in press-contact with the platen is made heightened than the other side to bring the thermal head into press-contact with the platen.

2 Claims, 15 Drawing Figures

THERMAL PRINTER WITH GRADUATED CAM ACTUATION

BACKGROUND OF THE INVENTION

1. Field of the Invention

This invention relates to a so-called thermal printer which transfers thermo-fusible material held by a print tape to a recording medium by means of heating of a thermal head to perform printing.

2. Description of the Prior Art

Hitherto, the transfer type thermal printer as shown in FIG. 3 in a plane view and FIG. 4 in a perspective view as known as one of the well-known thermal type printers. Explaining the prior art, the first conventional example, with reference to these drawings, in FIG. 1, 1 is a platen around which a recording paper (not shown) is set, 2 is a platen rubber, and 3 is a paper guide to guide the recording paper being rolled around the platen 1. 4 is a thermal head having plural heating elements and positioned as to oppose to the platen rubber 2, 5 is a carriage on which the thermal head 4 is mounted, and 7 is a tape cassette in which a print tape 6 holding thermo-fusible material to be transferred onto the recording paper is stored, this tape cassette 7 being mounted detachably on the carriage 5.

8 is a carriage guide plate on which the carriage 5 is mounted movably, this plate is pivotable about a supporting portion 9 as shown in FIG. 4(*a*) and has a groove 11 to guide carriage guide shafts 10 secured on the carriage 5 as shown in FIGS. 4(*a*) and 4(*b*). These carriage guide plate 8, carriage guide shafts 10 and groove 8 make up a carriage guide mechanism for guiding the carriage 5 along the front of the platen 1.

12 is a pressure spring for urging the carriage 5 on the carriage guide plate 8, i.e., thermal head 4, in the direction of approaching the platen rubber 2.

Shown in FIG. 3, 13 is a wire whose both ends are connected respectively to both end portions of the carriage 5, 14 and 15 are pulleys provided on the carriage guide plate 8, around which the wire 13 is engaged, and 16 is a drive pulley around which the wire 13 is engaged, having gears on both side portions, for example. These wire 13, pulleys 14 and 15, and drive pulley 16 make up a carriage moving means for moving the carriage 5 along the platen 1.

17 are paper feed rollers abutting on the recording paper, 18 is a paper feed shaft on which the paper feed rollers 17 are supported, these paper feed rollers 17 and paper feed shaft 18 make up a recording paper feeding means for feeding the recording paper in the arrow A direction in FIG. 3.

Shown in FIG. 3, 19 is a stepping motor, 20 is a motor gear provided on the output shaft of the motor 19, and 21 is an idle gear engaging with the motor gear 20 and the gear on one side portion of the drive pulley 16. 22 is a first intermittent gear engaging with the gear on the other side portion of the drive pulley 16, 23 is a second intermittent gear engaging with the first intermittent gear 22, 24 is a paper feed gear engaging with the second intermittent gear 23, 25 is a movable contact-mounting base, 26 is a ratchet engaging with the paper feed gear 24, and 27 is a ratchet engage/detach-able with the ratchet 26. 28 is a ratchet spring to urge the ratchet 27 in the direction of engaging with the ratchet 26, and 29 is a washer to define one end of the ratchet spring 28. 30 is a manual knob having on its periphery a gear engagable with a gear formed on the ratchet 27 to move the ratchet 27 in the direction of separating from the ratchet 26, and 31 is a lever to support pivoatably the manual knob 30.

The foregoing motor gear 20, idle gear 21, drive pulley 16, first intermittent gear 22, second intermittent gear 23 and paper feed gear 24 make up a gear section capable of linking the foregoing carriage moving means with the recording paper feeding means, i.e., a gear section for reciprocating the carriage 5 and feeding a certain extent of the recording paper in the arrow B direction in FIG. 3 in response to one reciprocating of the carriage 5.

The foregoing ratchets 26, 27 and manual knob 30 make up a manual paper feeding mechanism capable of feeding manually the recording paper backward, i.e., in the arrow C direction in FIG. 3.

As shown in FIGS. 3 and 6, on the shaft extending from the motor gear 20 of the motor 19 a drive gear 32 is provided, this drive gear 32 engaging via an idler 33 with a splice gear 34. This splice gear 34 is composed of a fixed gear 34*a* engaging with the drive gear 32 and a contact gear 34*b* contacting elastically with the fixed gear 34*a* owing to a spring 35. A rack unit 36 positioned in opposition to the splice gear 34 is composed of two-row tooth sections, one tooth section being a rack 36*c* having on either end a no-tooth portion 36*a* coming into gear with the fixed gear 34*a*, and the other tooth section being a complete-tooth portion 36*b* coming into gear with the contact gear 34*b*. These drive gear 32, splice gear 34, rack unit 36, etc. make up a cam operating means. From the rack unit 36 a T-shaped projection 37 is projecting, this projection 37 being provided as able to reciprocating within a hollow portion 38*d* formed inside a cam 38 made up, as shown in FIG. 5, of a low station 38*a*, a high station 38*b*, and a slope portion 38*c* between the low station 38*a* and the high station 38*b*.

The cam 38 is, as shown in FIGS. 4 and 5, in contact with a shaft part 40 of a receiving portion extending from the supporting portion 9 of the carriage guide plate 8.

Accordingly, when the receiving portion 39 is positioned on the low station 38*a* of the cam 38 as shown in FIG. 5(*a*) the thermal head 4 is in contact with the platen 1, whereas when the receiving portion 39 is positioned on the high station 38*b* of the cam 38 as shown in FIG. 5(*b*) the thermal head 4 separates from the platen 1 in resisting the pressure spring 12 and in this state, the movement or return action of the carriage 5 is performed by means of the wire 13.

Though the drive gear 32 of the foregoing cam operating means is always in the driven state by the motor 19, the stroke of the cam 38 or rack unit 36 is restricted to a certain extent by a stopper 41, so that, because the rack unit 36 is composed of the rack 36*c* provided with no-tooth portions 36*a* and the complete-tooth portion 36*b* arranged in two rows and the fixed gear 34*a* of the splice gear 34 is in gear with the rack 36*c* provided with no-tooth portions 36*a*, when the receiving portion 39 is positioned on an appropriate portion of the cam 38, i.e., when the splice gear 34 is positioned on either end portion of the rack unit 36, the fixed gear 34*a* does not gear with the rack unit and is idling so that the driving force of the motor 19 can not be applied directly to the rack unit 36 nor the cam 38.

In order to eliminate an influence of abrupt change due to forward/reverse rotation of the motor 19 on the respective parts, the projection 37 of the rack unit 36 is positioned within the hollow portion 38 inside the cam 38 so that there is a play between the rack unit 36 and the cam 38. Similarly, as shown in FIG. 7, with respect to the coupling relation between the carriage 5 and the wire 13, a gap D is left between an enlarged-diameter portion 13*a* provided on the wire 13 and a frame body 5*a* provided on the carriage 5 to give a play for movement, so that the movement of the carriage 5 can not be performed, but after the platen 1 and thermal head 4 have come completely to an appropriate state.

FIG. 8 is a plane view showing a print tape take-up device of the conventional thermal printer. In this drawing, 42 is a rack provided on the platen, and 43 is a print tape take-up device positioned as to oppose to the rack 42. This print tape take-up device 43 comprises the base or carriage 5, a gear 5*b* provided on the carriage 5 to rotate a take-up spool provided inside the tape cassette, a gear 5*c* engaging with the gear 5*b*, a lever 5*d* mounted pivotably on the gear 5*c*, a spring 5*e* whose one end is coupled to the lever 5*d* with the other end coupled to a pin secured on the carriage 5, and a gear 5*f* supported by the lever 5*d* and engagable with the rack 42.

The print tape take-up device 43 operates in such a manner that when the thermal head 4 is in the state of pressing the platen 2, the gear 5*f* is engaged with the rack 42, the gear 5*f* rotates in response to movement of the carriage 5, thereby causing via the gears 5*c* and 5*b* the tape take-up spool inside the tape cassette 7 to rotate and take up the print tape 44, whereby a desired transfer operation can be permitted. Contrarily, when the thermal head 4 is in the state of being separated from the platen 2, the gear 5*f* comes out of engagement with the rack 42 and the gear 5*f* does not rotate even the carriage 5 is moving, thus, the gears 5*c* and 5*b* do not rotate and the print tape 44 is held stationary.

According to the foregoing conventional thermal printer, the cam 38 is controlled by using a change in revolution direction of the stepping motor 19 as a trigger, so that the revolution direction of the stepping motor 19 at the time of continued-spacing action is same with that in the printing time, meaning that the print tape 44 is fed unnecessarily in the continued-spacing time too, similarly to the printing time. Generally, in the heat transfer type thermal printer, the lifetime of the print tape (ink ribbon) 6 is taken seriously and influences on the running cost, thus, such a fluitless consumption of the print tape 6 should be avoided.

For overcoming this problem, a mechanism shown specifically in FIGS. 9 through 11 is known. This mechanism will be described below.

FIG. 9 is an explanatory view showing the important portion of the second conventional example. In FIG. 9, 1 is the platen around which the recording paper is set, 2 is the platen rubber mounted on the front of the platen 2, the carriage 5 is positioned in opposition to the platen 1, and the thermal head having plural heating elements is mounted on the platen (1) side of the carriage 5 as to oppose to the platen. The carriage 5 is mounted movably on the carriage guide plate 8 and is pivotable about the supporting portion 9. On the receiving portion 39 at the point on the platen (1) side of the carriage guide plate 8 the shaft part 40 is provided, which abuts always on a portion of the low station 38*a*, high station 38*b* or slope portion 38*c*, which are upper face portions of the cam 38, to restrict the pivotable extent of the carriage guide plate 8. The projection 37 for linking the cam 38 with one side of the rack unit 36 transmits the action of the rack unit 36 to the cam 38. On the other side of the rack unit 36 there are provided an actuator 44 to support the rack unit 36 from the back at the column-up time, and a solenoid 45 to drive the actuator 44. 46 is a spring to lock the actuator 44, and 34*a* is the fixed gear engaging with the rack 36*c* on the no-tooth portion side of the rack unit 36. Other members not shown are constructed in the same way as is the case of the foregoing first conventional example.

Now, the operation of the mechanism of the second conventional example shown in FIGS. 9 through 11 will be described in comparing with the first conventional example, in which FIG. 10 is an explanatory view showing the positional relation between the rack unit 36 and the fixed gear 34*a* at the printing time, and FIG. 11 is an explanatory view showing the positional relation between the rack unit 36 and the fixed gear 34*a* at the non-printing time. The driving process from the motor 19, reciprocating action caused by the use of the no-tooth portions 36*a*, complete-tooth portion 36*b* and the like, etc. are identical to that of the first conventional example shown in FIG. 6, so not mentioned here especially.

The operation of the first conventional example will be described first.

(a) Printing operation (Column-up time)

1. The splice gear 34 to drive the cam 38 rotates rightwise.
2. The rack unit 36 and cam 38 move leftward and stop at the left-end within the movable extent (FIG. 10).
3. Because the fixed gear 34*a* of the splice gear to transmit the driving force from the motor 19 to the rack unit 36 comes out of engagement with the rack 36*c* and is positioned on the no-tooth portion 36*a* on the cam (38) side of the rack unit 36, the fixed gear 36*a* idles. Namely, because the contact gear 34*b* and the fixed gear 34*a* are pressed together by the spring 35 and the torque is transmitted only by means of the frictional force created between the above two, the rack unit 36 stops when it abuts on the stopper 41*b*, and the contact gear 36*b* in gear with the complete-tooth portion 36*b* stops, whereby inevitably the fixed gear 34*a* slips and idles. In this moment, as apparent from the drawing, because the shaft part 40 of the receiving portion 39 of the carriage guide plate 8 is abutting on the low station 38*a* of the cam 38, the thermal head 4 is pressed onto the platen rubber 2, thus, the gear 5*f* of the print tape take-up device 43 is in engagement with the rack 42 provided on the platen 1.

(b) Carriage return

1. The splice gear 34 rotates leftwise.
2. As the splice gear 34 rotates leftwise, the contact gear 34*b* receives the torque from the fixed gear 34*a* by means of the frictional force and transmits the driving force to the complete-tooth portion 36*b* of the rack unit 36, thereby moving the rack unit 36 and cam 38 rightward.
3. The fixed gear 34*a* comes into engagement with the rack 36*c* to move the rack unit 36 rightward, the fixed gear 34*a* comes to the position of the no-tooth portion 36*a*, but comes out of engagement with the rack 36*c* when the rack unit 36 abuts on the stopper 41*a* on the cam (38) side, the rack unit 36 and cam 38 stop at the right-end within the movable extent (FIG. 11).

In this moment, the fixed gear 34*a* is idling for the same reason as described above. Further, because the cam 38 is positioned at the right-end, the shaft part 40 abuts on the high station 38*b* of the cam 38, the carriage guide plate 8 pivots, the thermal head 4 separates from the platen rubber 2, thus, the thermal head 4 is released from the press-contact state. Accordingly, the gear 5*f* of the print tape take-up device 43 is released from the engaged state with the rack 42 provided on the platen 1, and feeding of the print tape 6 terminates.

Now, the operation of the second conventional example shown in FIGS. 9 through 11 will be described.

(a) Printing operation

1. Similarly to the first conventional example, the splice gear 34 rotates rightwise, the rack unit 36 and cam 38 move leftward and stop at the left-end within the movable extent. In this moment, for the reason as that described above, the fixed gear 34*a* is idling and the contact gear 34*b* is in a stop, like the rack unit 36.

(b) Release of press-contact head

1. The splice gear 34 is rotated leftwise, and the same operation as that at the time of carriage return in the first conventional example is performed.
2. In response to the above operation, the rack unit 36 and cam 38 move rightward, and the state of FIG. 11 results.
3. In the above state, if the solenoid 45 provided at its point with the actuator 44 is switched off, the actuator 44 pivots about its one end D owing to the action of the spring 46, its other end E abuts on the rack unit 36 to prevent moving of the rack 36 so that the rack 36 can not move leftward.

(c) Column-up in released state of head

1. In the above state, if the splice gear 34 is rotated rightwise, the carriage 5 may move in the column-up direction with the head being in the released state from the press-contact state.

However, in this moment, only the fixed gear 34*a* rotates; the rack unit 36 and cam 38 do not move in any direction because the actuator 44 blocks the leftward movement and the stopper 41*a* blocks the rightward movement even if any driving force is applied to the splice gear 34 and the fixed gear 34*a* is rotated in any direction. Further, because the gear 5*f* of the print tape take-up device 43 does not engage with the rack 42 on the platen 1, no feeding of the print tape 6 is performed.

(d) Press-contact of head and printing

1. After the column-up action shown in FIG. 9, if the solenoid 45 is powered, one end E of the actuator 44 moves up in resisting the elastic force of the spring 46, and the locked state of the rack unit 36 by the actuator 44 is released.
2. In response to unlocking of the rack unit 36, the splice gear 34 rotates rightwise.
3. The splice gear rotates rightwise to move the rack unit 36 leftward. As the state shown in FIG. 10 is obtained, the thermal head 4 is in press-contact with the platen rubber 2, whereby a normal printing can be commenced.

The foregoing operation will be described with reference to the diagram shown in FIG. 12.

At time F, the head 4 is in press-contact with the platen rubber 2 and is performing printing. During the above, the fixed gear 34*a* is rotating rightwise. Upon reaching time G, the column-up will be performed. At this time, the revolution direction of the fixed gear 34*a* is reversed into leftwise. Thus, for the interval from time G up to time H, the rack unit 36 moves in the right direction, so that the head 4 separates from the platen 1 due to the action of the cam 38 linked to the rack unit. Then, if the printing is desired to be re-commenced, the solenoid 45 is powered, so that the actuator 44 comes out of engagement with the rack unit 36 and the printing is re-started from time J. That is, the interval from time H to time I indicates the column-up state without feeding of the print tape 6.

However, according to the foregoing conventional examples, the cam 38 is driven by means of the splice gear 34, composed of the fixed gear 34*a* and the contact gear 34*b* contacting elastically with the former, and the rack unit 36, composed of the rack 36*c* having the no-tooth portions 36*a* gearing with the splice gear 34 and the complete-tooth portion 36*b*, thus, there arises sometimes the problem as below relating to an actual operation.

That is, the problem arises from a variation of frictional force appearing between the gear side faces of the fixed gear 34*a* and contact gear 34*b*. In case the frictional force is small, when the fixed gear 34*a* reaches the no-tooth portion 36*a* of the rack unit 36 while moving the cam 38, a slip occurs between it and the contact gear 34*b*, the rack unit 36 does not move enough up to a given position, and the fixed gear 34*a* is apt to idle in the vicinity of the tooth end portion of the rack 36*c*, this resulting in the problem. Under the state where the fixed gear 34*a* is positioned in the vicinity of the tooth end portion of the rack 36*c* and is idling there, as noted above, if the fixed gear 34*a* is reversed by rotating reversely the stepping motor 19 to shift the rack unit 36 backward, the tooth tip of the fixed gear 34*a* and the tooth tip of the tooth end portion of the rack 36*c* collide with each other and do not come well into gear mutually, movement of the rack unit 36 is disturbed, driving for the column-up or of the print tape 6 becomes incomplete, and a bad influence appears on the printing.

If the elastic strength of the spring 35 were increased in order to eliminate a variation of frictional force, a power is lost while the fixed gear 34 is idling and the stepping motor 19 is over-loaded, these becoming a cause of troubles.

SUMMARY OF THE INVENTION

The present invention has been devised in view of the foregoing circumstances of the conventional technique, and its object is to provide a thermal printer which, irrespective of a variation of frictional force between a fixed gear and a contact gear, causes no collision between the fixed gear and a rack, provides a smooth gearing between them, and raises no malfunction.

In order to achieve the foregoing object, the present invention resides in a thermal printer comprising a thermal head, a carriage mounted thereon with the thermal head and driven by a motor, a platen around which a recording paper is attached, a tape take-up device coming into engagement with a rack provided on the platen to roll up a print tape, a tape cassette storing therein the print tape and provided detachably on the carriage, a carriage guide plate on which the carriage is provided movably, pivotable as to cause the thermal head and the platen to approach/separate from each other, a cam means for pivoting the carriage guide plate, and a cam operating means driven by the motor to actuate the cam means, and is characterized in that a cam employed for the cam means is of a mountain-shaped form whose one side for pivoting the carriage guide plate to release the thermal head in press-contact with the platen is made heightened than the other side to bring the thermal head into press-contact with the platen.

BRIEF DESCRIPTION OF THE DRAWINGS

FIGS. 1 and 2 relate to an embodiment of the present invention, in which FIG. 1 is a front view of a cam according to the present invention;

FIG. 2 is an explanatory view showing the press-contact operation and press-contact releasing operation, relative to a platen rubber, of a thermal head employing the cam according to the present invention;

FIGS. 3 through 8 relate to a first example of the conventional thermal printer, in which FIG. 3 is a plane view showing a general construction;

FIG. 4(*a*) is a perspective view showing also the general construction;

FIG. 4(*b*) is a sectional view of a carriage portion;

FIGS. 5(*a*) and 5(*b*) are side views showing the change of positional relation between a platen and a carriage;

FIG. 6(*a*) is a plane view showing a relation between a cam and a cam operating means;

FIG. 6(*b*) is a partially enlarged view showing the structure of a rack unit;

FIG. 7 is a partially enlarged view showing a relation between a wire and a carriage;

FIG. 8 is a plane view showing an example of the print tape take-up device;

DESCRIPTION OF THE PREFERRED EMBODIMENT

Figure 1:
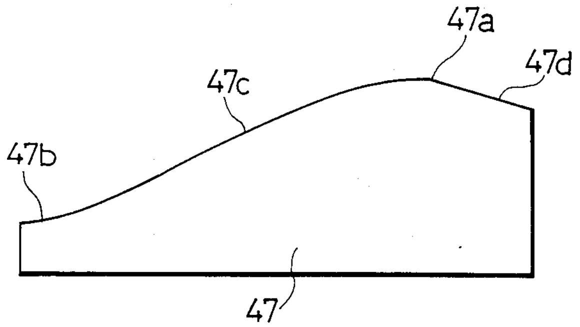

The embodiment of the present invention will be described with reference to the drawings. FIG. 1 is a plane view of a cam according to the present invention, and FIG. 2 is an explanatory view showing the important portion of the embodiment employing the cam shown in FIG. 1.

Cam 47 has a mountain-shaped appearance whose sliding surface is made up of a high station 47*a*, low station 47*b*, slope portion 47*c* formed of a smooth curved surface joining the high station 47*a* with the low station 47*b*, and a slant portion 47*d* formed of a planar down-grade surface continuing from the high station 47*a* (FIG. 1). To the side face on the side adjacent to the high station 47*a* and slant portion 47*d* or the peak side of the cam 47, the projection 37 similar to that included in the conventional examples is coupled, which transmits the action of the rack unit 36 to this cam 47 (FIG. 2). Other portions now shown and not mentioned specifically have the same structures as those of the second conventional example.

Figure 2:
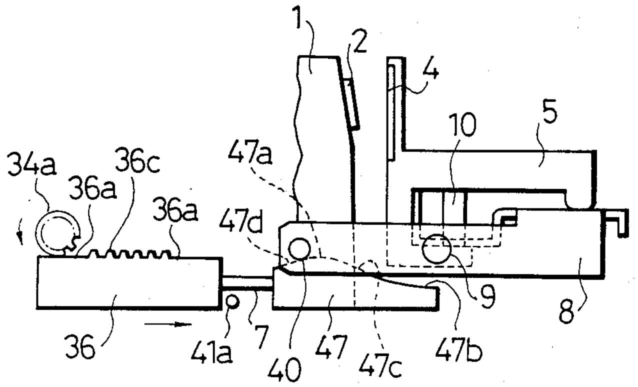
Figure 3:
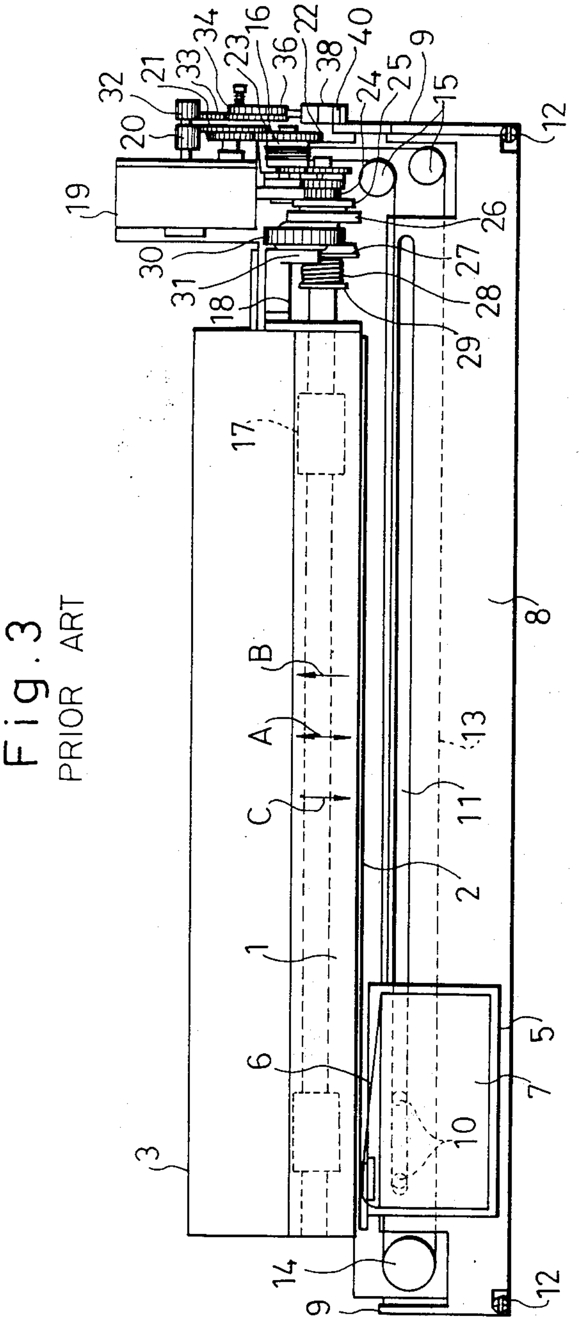
Fig. 3 PRIOR ART
Figure 4A:
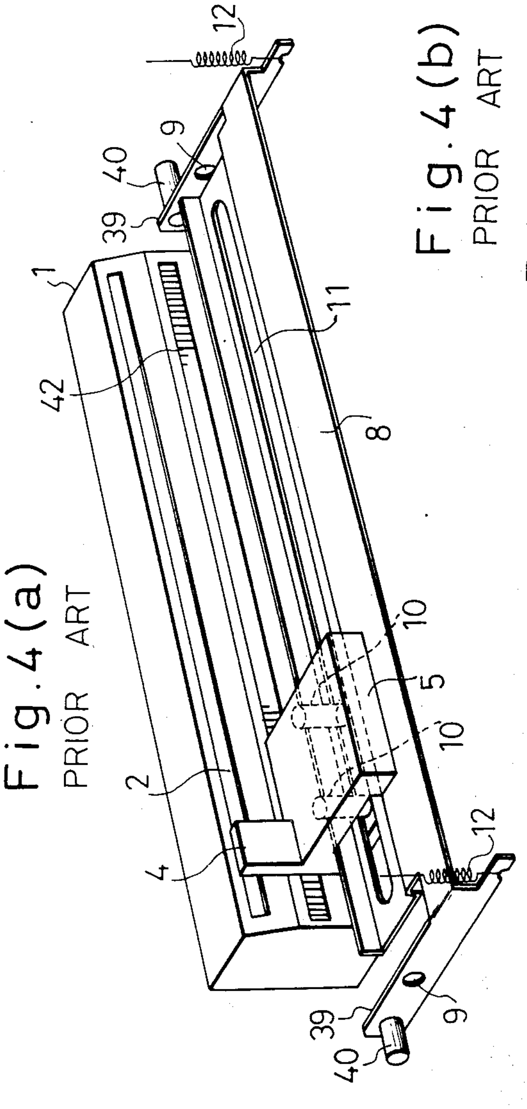
Fig. 4(a) PRIOR ART
Figure 4B:
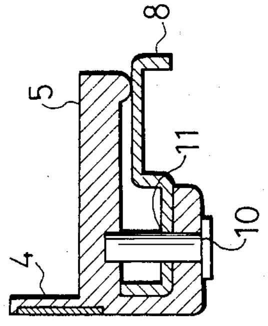
Fig. 4(b) PRIOR ART
Figure 5A:
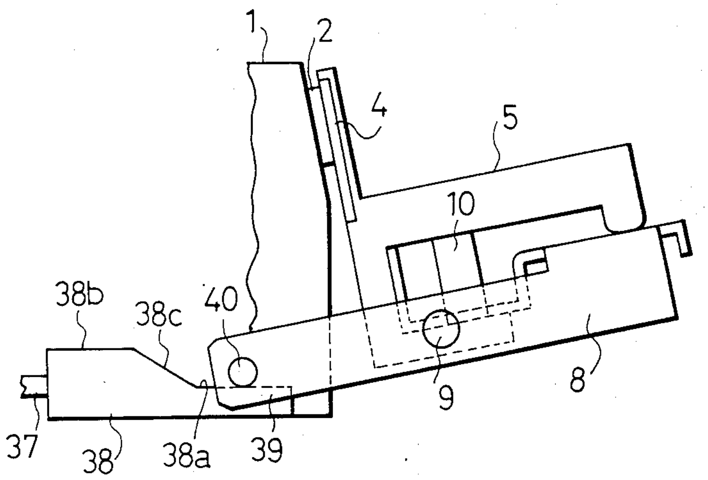
Fig. 5(a) PRIOR ART
Figure 5B:
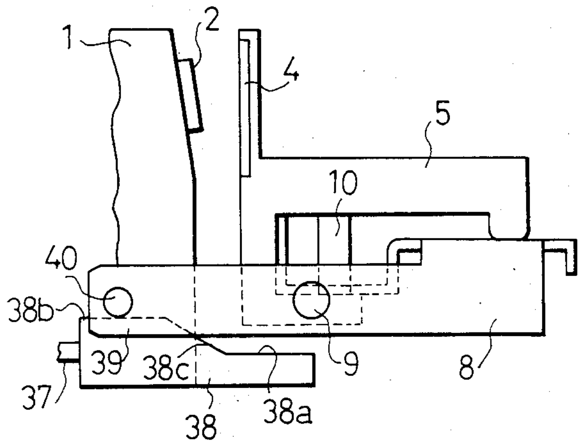
Fig. 5(b) PRIOR ART
Figure 6A:
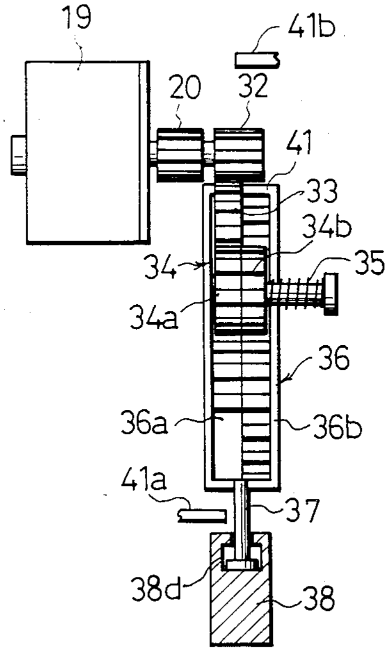
Fig. 6(a) PRIOR ART
Figure 6B:
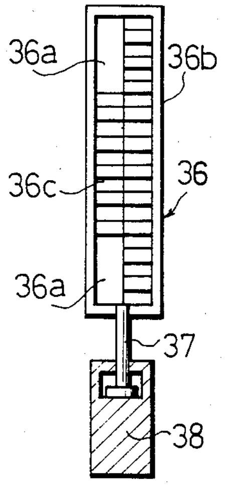
Fig. 6(b) PRIOR ART
Figure 7:
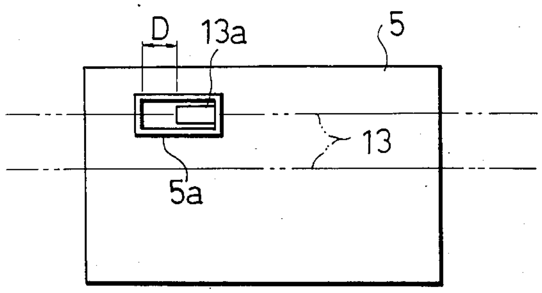
Fig. 7 PRIOR ART
Figure 8:
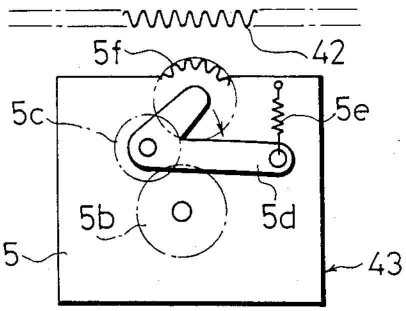
Fig. 8 PRIOR ART
Figure 9:
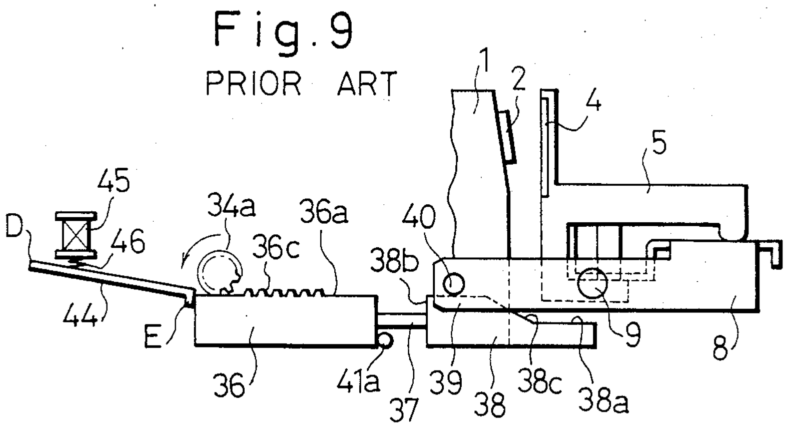
Fig. 9 PRIOR ART
FIG. 9 is an explanatory view showing a locking mechanism of a rack unit of a second conventional example.
Figure 10:
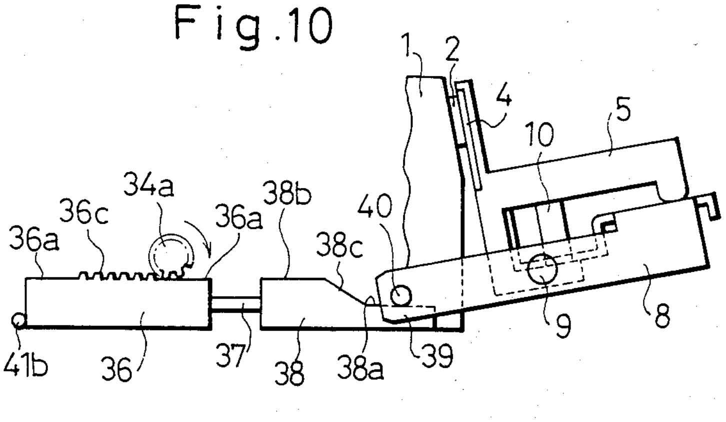
FIGS. 10 and 11 are explanatory views showing the change of positional relation among rack unit, fixed gear, cam and carriage.
Figure 11:
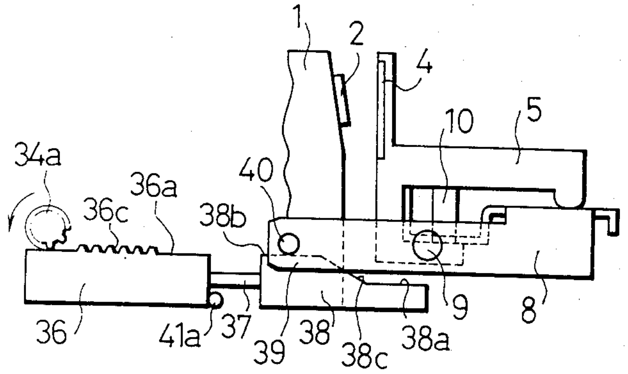
Figure 12:
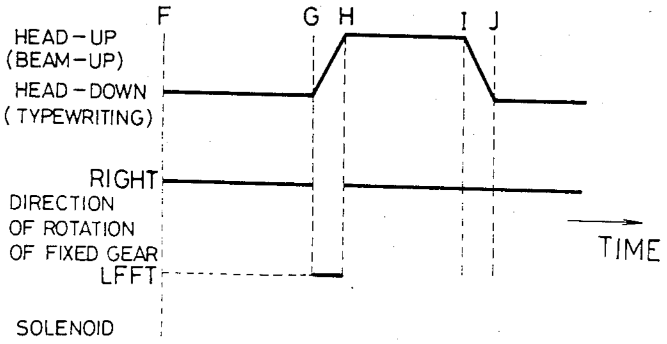
Fig.12 PRIOR ART
FIG. 12 is a diagram showing the operation of the conventional thermal printer.

In this present embodiment, as the fixed gear 34*a* rotates leftwise as viewed in FIG. 2, the rack unit 36 advances rightward, the cam 47 moves rightward, and the shaft part 40 of the carriage guide plate 8 passes over the highest station 47*a* of the cam 47. When the shaft part 40 rides a little on the slant portion 47*d*, the fixed gear 34*a* is positioned just on the no-tooth portion 36*a* of the rack unit 36 so that press-contact of the thermal head 4 with the platen rubber 2 is released. In this moment, because the shaft part 40 is positioned on the down-grade slant, the kinetic energy required to move the cam 47 is small in comparison to the case of the conventional horizontal plane, thus, there occurs no slipping between the side faces of the fixed gear 34*a* and contact gear 34*b* even if the frictional force therebetween becomes small, and the rack unit 36 can be driven sufficiently up to the position where it abuts on the stopper 41*a*. Therefore, even when the fixed gear 34*a* is reversed to cause the thermal head 4 to come into press-contact with the platen rubber 2, a sufficient approach is given before coming to the tooth end of the rack 36*c*, and the tooth tip of the fixed gear 34*a* and the tooth tip of the rack 36*c* come smoothly into gear with each other without collision.

On the other hand, the slope portion 47*c* of the cam 47 is extended up to the lowest station 47*b*, contrarily to the horizontal surface of the low station 38*a* in the conventional examples, thus, this slope portion has the same function as that of the slant portion 47*d*, and the fixed gear 34*a* can be positioned just on the no-tooth portion 36*a* at the right-end of the rack unit 36. Therefore, in this case, also, the tooth tip of the fixed gear 34*a* and the tooth tip in the tooth end portion of the rack 36*c* come smoothly into gear with each other at the time of reversing of the fixed gear 34*a* without collision.

As apparent from the foregoing structure, according to the present invention in which the cam is of the mountain-shaped form and the rack unit can be driven by the use of the down-grade slope, irrespective of a variation of frictional force between the fixed gear and the contact gear, the press-contact operation and press-contact releasing operation of the thermal head with respect to the platen rubber can be achieved surely, and a malfunction caused by some abnormal gearing between the rack unit and the splice gear can be dissolved. Further, because collision between the tooth tips of the rack unit and splice gear is obviated, there result in such effects as that noise and vibration can be prevented from appearing, the tooth is not damaged, and waste consumption of the print tape can surely be prevented.

While the preferred embodiment has been described, variations thereto will occur to those skilled in the art within the scope of the present inventive concepts which are delineated by the following claims.

What is claimed is:

1. A thermal printer comprising
 a thermal head,
 a carriage mounted thereon with said thermal head and driven by a motor,
 a platen around which a recording paper is attached,
 a tape take-up device for rolling up a print tape in response to movement of said carriage,
 a tape cassette storing therein the print tape and provided detachably on said carriage,
 a carriage guide plate on which said carriage is provided movably, pivotable as to cause said thermal head and said platen to approach/separate from each other,
 a cam means for pivoting said carriage guide plate, and
 a cam operating means driven by said motor to actuate said cam means,
 characterized in that a cam employed for said cam means is of a mountain-shaped form whose one side for pivoting said carriage guide plate to release said thermal head in press-contact with said platen is made heightened than the other side to bring said thermal head into press-contact with said platen.

2. A thermal printer as set forth in claim 1, wherein the sliding surface of said cam is made up of a high station (47*a*), low station (47*b*), slope portion (47*c*) formed of a smooth curved surface joining the high station (47*a*) with the low station (47*b*), and a slant portion (47*d*) formed of a planar down-grade surface continuing from the high station (47*a*).

* * * * *